United States Patent [19]
Watanabe et al.

[11] Patent Number: 5,947,175
[45] Date of Patent: Sep. 7, 1999

[54] MULTI-PIECE RIM

[75] Inventors: Ryoichi Watanabe, Toyokawa; Kenji Yoshii, Toyohashi; Ichiro Takeuchi, Ayase, all of Japan

[73] Assignee: Topy Kogyo Kabushiki Kaisha, Tokyo, Japan

[21] Appl. No.: 08/988,406

[22] Filed: Dec. 10, 1997

[51] Int. Cl.$^6$ ................................................ B60B 25/04
[52] U.S. Cl. ................................................ 152/409; 152/410
[58] Field of Search ................................. 152/409, 410, 152/DIG. 10, 402, 405

[56] References Cited

U.S. PATENT DOCUMENTS

| | | | |
|---|---|---|---|
| 2,478,580 | 8/1949 | Hollerith | 152/409 X |
| 3,623,530 | 11/1971 | Beyers et al. | 152/410 |
| 4,554,961 | 11/1985 | Osawa et al. | 152/410 |
| 4,911,216 | 3/1990 | Yamoto et al. | 152/410 |

FOREIGN PATENT DOCUMENTS 1001910   1/1957   Germany .

*Primary Examiner*—Russell D. Stormer
*Attorney, Agent, or Firm*—Pillsbury Madison & Sutro LLP

[57] ABSTRACT

A multi-piece rim includes a lock ring and a gutter band having a lock ring groove. The lock ring groove includes a bottom surface, axially inboard and outboard curved surfaces connected to opposite ends of the bottom surface, and axially inboard and outboard side surfaces connected to the axially inboard and outboard curved surfaces. A lock ring escaping groove is formed at a transition point from the axially outboard curved surface to the axially outboard side surface and a surface portion adjacent to the transition point. The lock ring escaping groove is recessed in a direction away from the lock ring.

5 Claims, 3 Drawing Sheets

MULTI-PIECE RIM

BACKGROUND OF THE INVENTION

1. Field of the Invention

The present invention relates to a multi-piece rim used for off-road wheels, for example, large and very large wheels for construction vehicles, and more particularly, relates to a fretting preventing structure for a lock ring groove of the multi-piece rim.

2. Description of the Prior Art

FIG. 3 illustrates the structure of a conventional multi-piece rim and FIG. 4 illustrates an enlarged cross-section of a portion of the multi-piece rim. As illustrated in FIGS. 3 and 4, the multi-piece rim includes a gutter band 1 which has a lock ring groove 6 and an O-ring groove 7, a lock ring 2 which has a slit in the circumferential direction and is mounted in the lock ring groove 6, a bead seat band 3 mounted onto the gutter band 1 and axially supported by the lock ring 2, a side ring 4 mounted onto the bead seat band 3 and axially supported by the bead seat band 3, and an O-ring 5 located at the O-ring groove 7.

The lock ring groove 6 includes a bottom surface 6a, side surfaces 6b, and curved surfaces 6c connecting the bottom surface 6a and the side surfaces 6b.

The conventional multi-piece rim has the following problems.

More particularly, when the multi-piece rim is mounted to a construction vehicle and is driven, contact pressure and relative sliding repeatedly occur at the contact surfaces between the members including the gutter band 1, the lock ring 2, the bead seat band 3 and the side ring 4. As a result, fretting is caused in the contact surfaces, and cracks are initiated and then develop into large cracks. When the cracks penetrate the entire thickness of the wall, the rim will cause fracturing.

Especially, as illustrated in FIGS. 4 and 5, the transition point from the axially outboard curved surface 6c to the axially outboard side surface 6b of the lock ring groove 6 formed in the gutter band 1 and a portion adjacent to the transition point (especially, a portion in the curved surface 6c) are repeatedly brought into contact with the lock ring 2 and repeatedly receive a load from the lock ring 2 in direction A (a radially inwardly and axially outboard direction). As a result, the transition point and the portion adjacent to the transition point will cause small cracks d which will develop into large cracks c (FIG. 6). When the cracks finally penetrate the full thickness of the gutter band 1, the gutter band 1 will be broken.

SUMMARY OF THE INVENTION

An object of the present invention is to provide a multi-piece rim which can suppress initiation of cracks and development of the cracks at the transition point from the outboard curved surface to the outboard side surface of the lock ring groove and the portion adjacent to the transition point.

A multi-piece rim according to the present invention includes: a gutter band including a lock ring groove which includes a bottom surface having axially outboard and inboard ends, axially outboard and inboard curved surfaces connected to the axially outboard and inboard ends of the bottom surface, and axially outboard and inboard side surfaces connected to the axially outboard and inboard curved surfaces and extending radially outwardly; and a lock ring engaging the gutter band at the lock ring groove and axially supported by the gutter band. The gutter band includes a lock ring escaping groove formed in the gutter band at a transition point from the axially outboard curved surface to the axially outboard side surface of the lock ring groove and a surface portion of the lock ring groove adjacent to the transition point. The lock ring escaping groove is recessed in a direction away from the lock ring and extends over an entire circumference of the lock ring groove.

Due to the lock ring escaping groove, the lock ring groove does not contact the lock ring at the transition point from the axially outboard curved surface to the axially outboard side surface of the lock ring groove and a surface portion of the lock ring groove adjacent to the transition point. As a result, fretting and stress concentration do not occur at the transition point and the surface portion adjacent to the transition point, and crack initiation and crack development are suppressed.

BRIEF DESCRIPTION OF THE DRAWINGS

The above and other optional features, and advantages of the present invention will become more apparent and will be more readily appreciated from the following detailed description of the preferred embodiments of the present invention given in conjunction with the accompanying drawings, in which.

DETAILED DESCRIPTION OF THE PREFERRED EMBODIMENT

Figure 1:
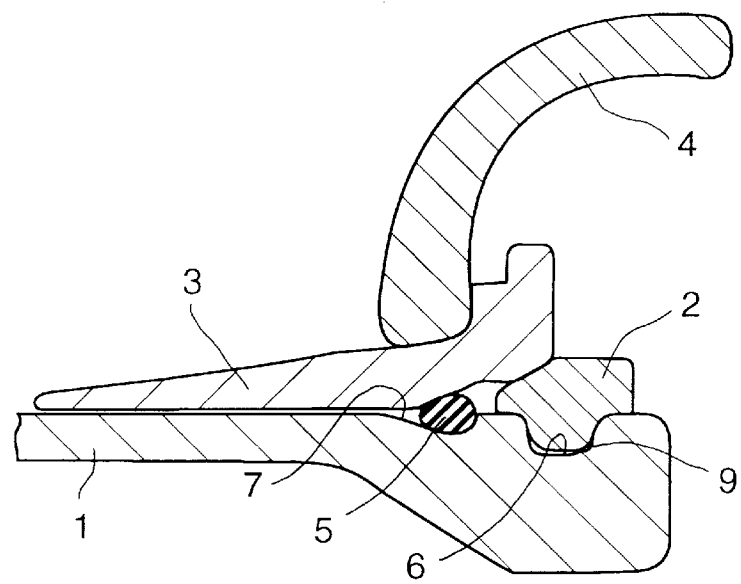
FIG. 1 is a cross-sectional view of a portion of a multi-piece rim according to one embodiment of the present invention.
Figure 2:
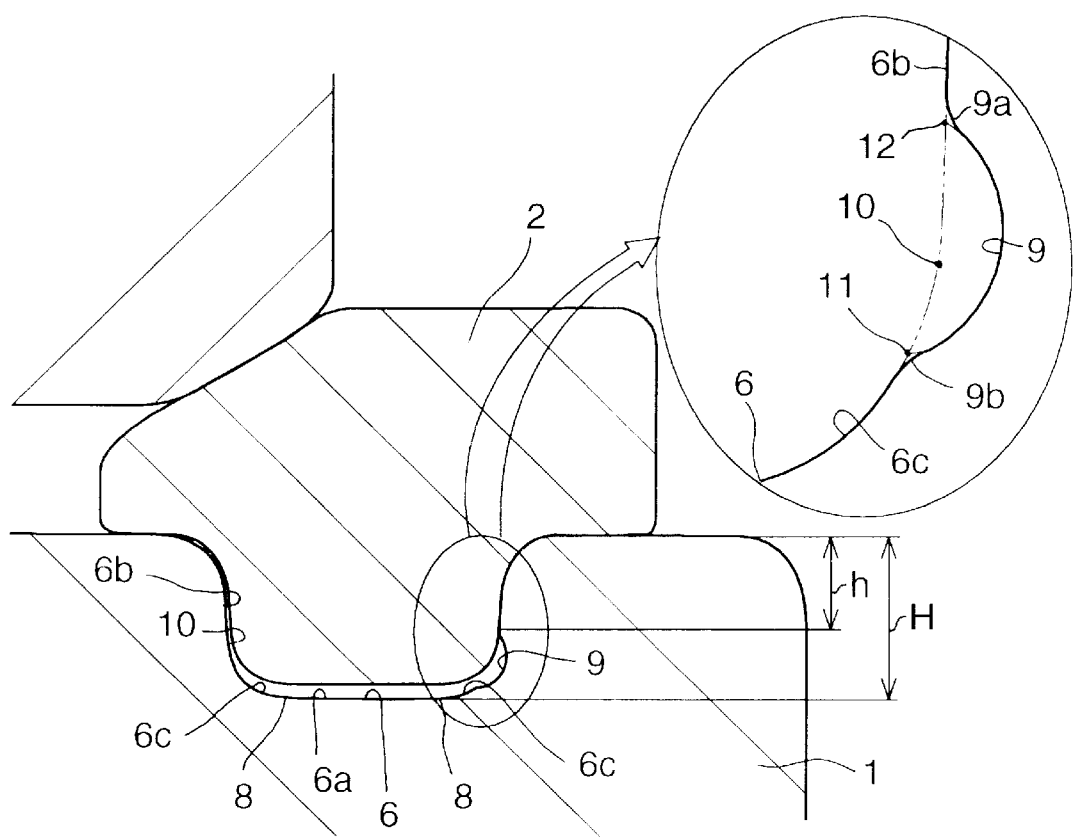
FIG. 2 is an enlarged cross-sectional view of a portion of the multi-piece rim of FIG. 1 adjacent to a lock ring groove.
Figure 3:
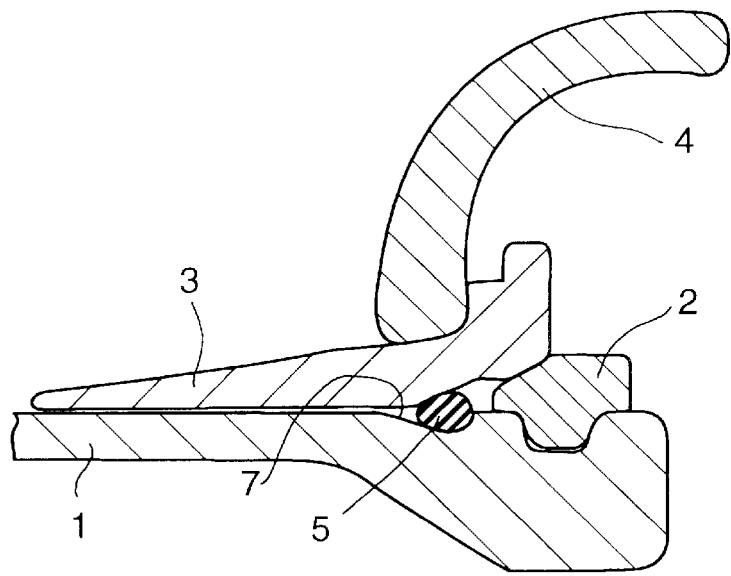
FIG. 3 is a cross-sectional view of a portion of a conventional multi-piece rim.
Figure 4:
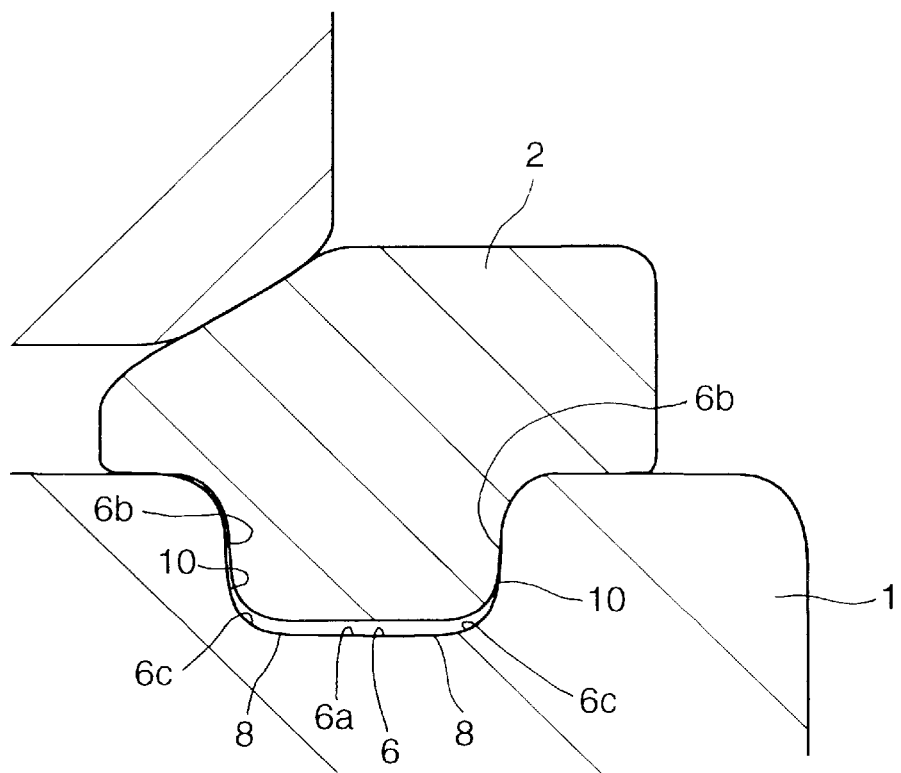
FIG. 4 is an enlarged cross-sectional view of a portion of the multi-piece rim of FIG. 3 adjacent to a lock ring groove.
Figure 5:
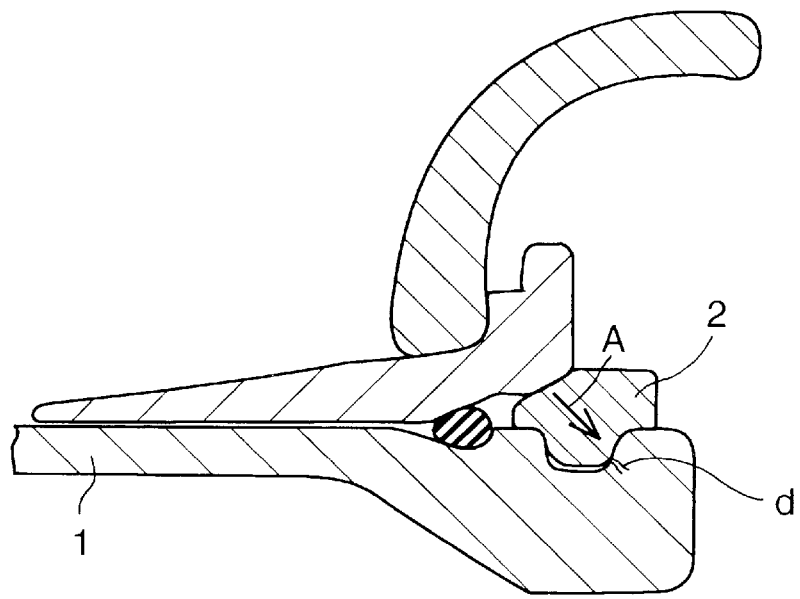
FIG. 5 is a cross-sectional view of the conventional multi-piece rim illustrating initiation of small cracks.
Figure 6:
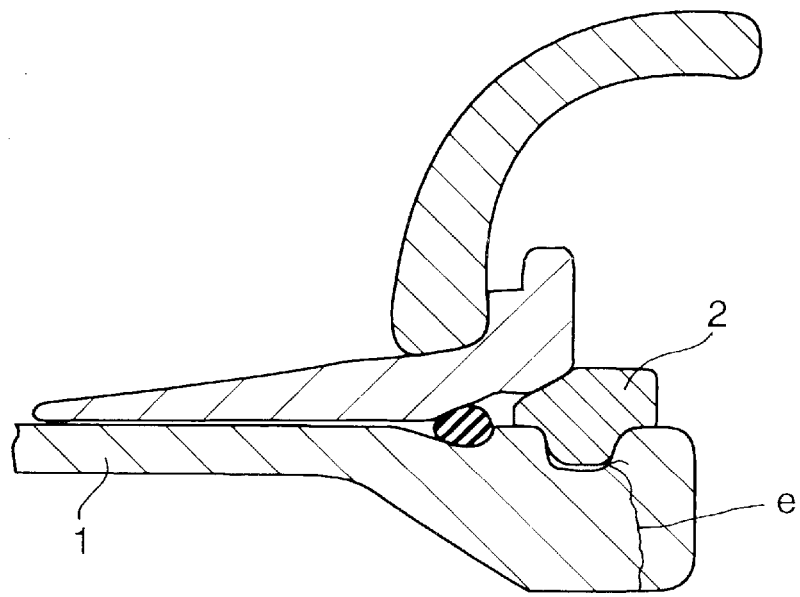
FIG. 6 is a cross-sectional view of the conventional multi-piece rim illustrating development of the cracks to large cracks.

FIGS. 1 and 2 illustrate a portion of a multi-piece rim according to the present invention. In FIGS. 1 and 2, portions similar in structure to those of the conventional multi-piece rim are denoted with the same reference numerals as those shown in FIGS. 3 and 4.

As illustrated in FIGS. 1 and 2, the multi-piece rim according to the present invention includes a gutter band 1, a lock ring 2, a bead seat hand 3, a side ring 4, and an O-ring 5.

The gutter band 1 includes a lock ring groove 6 and an O-ring groove 7. The lock ring groove 6 includes a bottom surface 6a having axially outboard and inboard ends 8, axially outboard and inboard curved surfaces 6c connected to the axially outboard and inboard ends 8 of the bottom surface 6, and axially outboard and inboard side surfaces 6b connected to the axially outboard and inboard curved surfaces 6c and extending radially outwardly. The axially outboard and inboard side surfaces 6b are connected at a transition point 10 before groove 9, which will be explained later, is machined. The side surfaces 6b extend substantially straight and radially outwardly and are connected to the outside surface of the gutter band via curved surfaces.

The lock ring 2 engages the gutter band 1 at the lock ring groove 6 and is axially supported by the axially outboard side surface 6b of the gutter band 1. The lock ring 2 has one slit in a circumferential direction. The lock ring 2 has opposite ends which are opposed to each other at the slit in the circumferential direction of the lock ring 2. When the lock ring 2 is mounted to the lock ring groove 6, the lock ring 2 is expanded in diameter, then is moved to the position of the lock ring groove 6, and then is fit to the lock ring groove due to its spring back force by releasing the expansion force. Since the lock ring 2 is made from spring material, the lock ring 2 has a larger surface hardness than the gutter band 1. As a result, when the surface of the lock ring 2 and the surface of the lock ring groove 6 of the gutter band 1 repeatedly come into pressure contact with each other, fretting and small cracks occur in the surface of the gutter band 1 sooner than in the surface of the lock ring 2.

The bead seat band 3 is disposed on a radially outer side of the gutter band 1 and is axially supported by the lock ring 2. The side ring 4 is disposed on a radially outer side of the bead seat band 3 and is axially supported by the bead seat band 3. The O-ring 5 is disposed at the O-ring groove 7 and radially between the gutter band 1 and the bead seat band 3.

The gutter band 1 includes a lock ring escaping groove 9 formed in the gutter band 1 at a transition point 10 from the axially outboard curved surface 6c to the axially outboard side surface 6b of the lock ring groove 6 and a surface portion of the lock ring groove 6 adjacent to the transition point 10. The transition point 10 and the portion (especially, of the axially outboard curved surface 6c) adjacent to the transition point 10 is a surface portion that most tends to receive fretting damage if the lock ring escaping groove 9 were not provided. The transition point 10 is deleted during machining the lock ring escaping groove 9. The lock ring escaping groove 9 is recessed in a direction away from the lock ring 2 and extends over an entire circumference of the lock ring groove 6.

The lock ring escaping groove 9 is formed by machining. Preferably, the lock ring escaping groove 9 has a cross-section having an arc configuration from the view point of case in machining and prevention of contact of the groove surface of the lock ring escaping groove 9 with the lock ring 2.

Intersections 11 and 12 (including a radially inner intersection 11 located radially inside of an innermost surface of the lock ring 2 and a radially outer intersection 12 located radially outside of the innermost surface of the lock ring 2) between the lock ring escaping groove 9 and the lock ring groove 6 (which includes the curved surface 6c and the side surface 6b) are curved surfaces: namely, rounded so as to be convex toward the lock ring 2 to form curved portions 9b and 9a (including a radially inner curved portion 9b and a radially outer curved portion 9a) so that stress is not concentrated at the intersections 11 and 12. The radius of the curved portions 9a and 9b is greater than a radius of the arc of the lock ring escaping groove 9. The curved portions 9a and 9b form a portion of the lock ring escaping groove 9.

The lock ring escaping groove 9 includes a deepest portion (deepest groove portion) which has a depth of 0.5–2 mm from a configuration of the lock ring groove 6 at a stage before the lock ring escaping groove 9 is machined. The reason for the value of 0.5 mm is that the groove surface of the lock ring escaping groove 9 is prevented from contacting the lock ring 2 even if the axially outboard side surface 6b of the lock ring groove 6 is severely deformed when it receives a force from the lock ring 2. The reason for the value of 2 mm is to maintain the strength of the wall of the gutter band 1 corresponding to the axially outboard surface 6b of the lock ring groove 6. More preferably, the depth of the lock ring escaping groove 9 is selected to be about 1 mm.

The lock ring escaping groove 9 has a radially outer end (that is, a radially outer end of the radially outer curved portion 9a) spaced radially inwardly from the outer surface of the gutter band 1 by a depth h that is greater than one third of a depth H of the lock ring groove 6. The reason is that if the depth h is greater than one third of the depth of the lock ring groove, the remaining contact surface between the lock ring 2 and the side surface 6b of the lock ring groove 6 is too small and a large stress will be caused at the remaining surface when a load acts on the side surface 6b from the lock ring 2.

Due to the above-described structure, the occurrence of stress concentration at the transition point 10 from the axially outboard curved surface 6c to the axially outboard side surface 6b of the lock ring groove 6 and the surface portion of the lock ring groove adjacent to the transition point 10 where stress concentration most tended to occur in the conventional rim can be effectively prevented. As a result, initiation of small cracks at the transition point 10 and the portion adjacent to the transition point 10 and development of the small cracks to the large cracks, which will induce fracture of the gutter band 1, will be effectively prevented. This prolongs the life of the wheel rim, more particularly, by more than doubling the life.

According to the present invention, the following technical advantages are obtained:

First, since the lock ring escaping groove is provided, stress concentration at the transition point 10 from the axially outboard curved surface 6c to the axially outboard side surface 6b of the lock ring groove 6 and the surface portion of the lock ring groove adjacent to the transition point 10 is effectively prevented. As a result, initiation of cracks and fracture due to development of the cracks are suppressed.

In the case where the configuration of the lock ring escaping groove 9 is selected to be an arc, machining the lock ring escaping groove 9 is easy and contact of the surface of the lock ring escaping groove 9 with the lock ring 2 is surely prevented.

In the case where curved surfaces 9a and 9b are formed at the intersection of the configuration of the lock ring escaping groove 9 and the configuration of the lock ring groove 6, stress concentration at the intersections are effectively prevented, so that reliable improvement of the life of the rim is achieved.

In the case where the depth of the deepest portion of the lock ring escaping groove 9 is selected to be 0.5–2 mm, contact of the surface of the lock ring escaping groove 9 with the lock ring 2 is severely prevented, even if the gutter band 1 is severely deformed when it receives a load from the lock ring 2.

Last, in the case where the lock ring escaping groove 9 is provided such that it is located more than one third of the depth of the lock ring groove 6 in the radial inboard direction, stress caused in the remaining side surface 6b is maintained to be small.

Although the present invention has been described with reference to a specific exemplary embodiment, it will be appreciated in the art that various modifications and alterations can be made to the particular embodiments shown. without materially departing from the novel teachings and advantages of the present invention. Accordingly, it is to be understood that all such modifications and alterations are included within the spirit and scope of the present invention as defined by the following claims.

What is claimed is:

1. A multi-piece rim comprising:

a gutter band including a lock ring groove, an O-ring groove, and an outside surface, said lock ring groove including a bottom surface having axially outboard and inboard ends, axially outboard and inboard curved surfaces connected to said axially outboard and inboard ends of said bottom surface, and axially outboard and inboard side surfaces connected to said axially outboard and inboard curved surfaces to extend radially outwardly, said outboard and inboard curved surfaces and said axially outboard and inboard side surfaces defining axially outboard and inboard transition points therebetween, respectively, said bottom surface of said lock ring groove and said outside surface of said gutter band defining a depth of said lock ring groove therebetween;

a lock ring engaging said gutter band at said lock ring groove and axially supported by said gutter band, said lock ring having one slit in a circumferential direction, said lock ring having an innermost surface, said innermost surface of said lock ring and said bottom surface of said lock ring groove defining a gap therebetween;

a bead seat band disposed on a radially outer side of said gutter band and axially supported by said lock ring;

a side ring disposed on a radially outer side of said bead seat band and axially supported by said bead seat band; and an O-ring disposed at said O-ring groove and between said gutter band and said bead seat band, wherein said gutter band includes a lock ring escaping groove formed in said gutter band at said axially outboard transition point from said axially outboard curved surface to said axially outboard side surface of said lock ring groove and a surface portion of said lock ring groove adjacent to said transition point, said lock ring escaping groove being recessed in a direction away from said lock ring and extending over an entire circumference of said lock ring groove.

2. A multi-piece rim according to claim 1, wherein said lock ring escaping groove has a cross-section having an arc configuration.

3. A multi-piece rim according to claim 1, wherein said lock ring escaping groove and said lock ring groove have a rounded intersection therebetween.

4. A multi-piece rim according to claim 1, wherein said lock ring escaping groove includes a deepest portion which has a depth of 0.5–2 mm.

5. A multi-piece rim according to claim 1, wherein said lock ring escaping groove has a radially outer end spaced radially inwardly from an outer surface of said gutter band by more than one third of said depth of said lock ring groove.

* * * * *